United States Patent [19]
Parilla

[11] 3,727,843
[45] Apr. 17, 1973

[54] DUCT-FORMING ASSEMBLIES AND VECTOR CONTROL

[76] Inventor: Arthur R. Parilla, Box 127, Mountain Lakes, N.J. 07046

[22] Filed: July 16, 1969

[21] Appl. No.: 842,149

[52] U.S. Cl............................239/265.35, 239/587
[51] Int. Cl..............................................B64c 15/04
[58] Field of Search...................239/265.33, 265.35, 239/265.37; 60/268, 232; 102/493, 498

[56] References Cited

UNITED STATES PATENTS

| | | | |
|---|---|---|---|
| 3,136,250 | 6/1964 | Humphrey | 244/3.27 |
| 3,237,890 | 3/1966 | Thielman | 239/265.35 |
| 3,401,887 | 9/1968 | Sheppard | 60/232 |
| 3,446,437 | 5/1969 | McCullough et al. | 60/232 |

*Primary Examiner*—Samuel Feinberg
*Attorney*—Morgan, Finnegan, Durham & Pine

[57] ABSTRACT

A pair of concentrically arranged members defining an annular duct therebetween including a throat section of minimum cross-sectional area are rigidly interconnected and universally mounted for omnidirectional rotation as a unit within an outer annular housing having an inner spherical seat. Two mutually independent rotational actuating systems, each employing a diametrically opposed pair of fluid cavity actuators built into the outer duct-forming member and pivotally mounted on the outer housing, provide simultaneous rotational control about two mutually orthogonal diametrical axes passing through the spherical center of rotation of the members and the pivot axes of the two actuator pairs. The upstanding walls of each actuator cavity are defined by a floating sealing member. Throat area adjustability is provided by an independently controlled annular throat adjusting segment which is constrained to translational motion along the duct axis relative to the inner member and has an axially skewed throat defining surface. Control over the position of the throat adjusting segment is via a toroidal bladder having a rectangular cross-section.

35 Claims, 20 Drawing Figures

INVENTOR
ARTHUR R. PARILLA
BY
Morgan, Finnegan, Durham & Pine
ATTORNEYS

INVENTOR.
ARTHUR R. PARILLA
BY
Morgan, Finnegan, Durham & Pine
ATTORNEYS

INVENTOR.
ARTHUR R. PARILLA

INVENTOR
ARTHUR R. PARILLA
BY
Morgan, Finnegan, Durham & Pine
ATTORNEYS 3,727,843

DUCT-FORMING ASSEMBLIES AND VECTOR CONTROL

BACKGROUND AND SUMMARY OF THE INVENTION

Within recent years, considerable effort has been devoted to the development of rocket engines and ballistic missile systems. A substantial amount of attention has been focused on the reaction nozzle structures employed for missile propulsion. Increased maneuverability requiring higher angular thrust vector control capabilities is constantly being demanded. Latest evaluations indicate that in order to meet present day missile system needs, large angular displacements of the thrust vector greater than has heretofore been possible with known nozzle structures must be attained.

Rocket engine nozzles have been developed which employ a central or inner pintle member concentrically arranged within an outer annular member to define an annular fluid duct leading to an annular throat area of minimum cross-section where the propulsion fluid attains sonic velocity. While thrust vector direction control of such nozzles has been accomplished, heavy gimbaled structures, flexible hose lines and the like are required and the maximum angular displacement that has been attained with conventional actuators within prescribed envelope area limitations is not nearly sufficient to meet current needs.

Applicant has previously made inventions in actuating instrumentalities for rotating an outer duct-forming member relative to a fixed inner member for attaining angular displacement of the thrust vector which are disclosed in applicant's prior U.S. Pat. Nos. 3,094,072 and 3,151,446 and copending application Ser. No. 607,068. However, such structures are not capable of providing the desired vector direction control due to the inherent fluid flow turning kinematics involved in altering t the duct geometry. Efficiency drops sharply as large angles are approached, due in large measure to the fact that the working fluid is forced to undergo a change of direction in such structures at or near the throat area when it has already attained extremely high velocities within the sonic range.

The instant invention has as one of its objects the provision of a duct-forming assembly which is capable of attaining large omnidirectional angular displacements of the duct axis from its symmetrical flow 0° position suitable for meeting current missile system needs.

It is a further object of the instant invention to provide a duct-forming assembly characterized by the above which is rigidly mounted thereby eliminating the need for gimbaled structures and, for the most part, flexible hose lines.

It is still a further object of the instant invention to provide a duct-forming assembly characterized by the above which does not require the development of new structural members or the employment of expensive and heavy flexible members.

It is another object of the instant invention to provide a duct-forming assembly characterized by the above wherein a duct-forming assembly characterized by the above wherein the outer envelope is minimized in size by eliminating the need for conventional rotational actuators through the provision of special cavity actuators which are built into the rotatable portion of the assembly.

It is yet another object of he instant invention to provide a duct-forming assembly characterized by the above wherein angular displacement or rotation is achieved without substantially affecting the duct geometry.

It is still another object of the instant invention to provide a duct-forming assembly characterized by the above which is ideally suited for use as a reaction nozzle for rocket engines.

A further object of the instant invention is to provide a duct-forming assembly characterized by the above which is capable of providing in a rocket engine hitherto unattainable thrust vector rotational control without any appreciable losses of efficiency at the higher angles of displacement and within an outer envelope which is well below maximum prescribed area limitations.

The prior art nozzle assemblies have also been able to provide a degree of control over the throat area as a means for providing control over the magnitude of the thrust vector. This has been accomplished in some instances by moving the inner duct-forming member along the axis of symmetry of the nozzle relative to the outer cowl member. The difficulty with this type of arrangement is that fluid passages, hydraulic pistons, high pressure seals and other internal plumbing is required within the hostile environment inside the envelope of the engine.

It is another object of the invention to provide a duct-forming assembly as characterized above which has a throat area control capability.

It is yet another object of the instant invention to provide a duct-forming assembly characterized by the above wherein throat area control is achieved independently of and simultaneously with rotational control.

It is a further object of the invention to provide a duct-forming assembly characterized by the above wherein throat area control is attained without the need for internal plumbing such as is associated with conventional actuators and arrangements.

It is still a further object of the instant invention to provide a duct-forming assembly as characterized which is adapted to maximize the throat area upon failure of the associated actuating control system to thereby establish a "fail safe" condition for rocket engines.

Additional objects, features and advantages of the instant invention include:

The provision of a duct-forming assembly wherein energy storage requirements for rotational actuating systems are minimized and frequency of rotational response maximized by minimizing the moment of inertia of the rotatable portion of the assembly and maximizing the distances from the center of rotation of said structure to the application points of the rotational forces.

The provision of a duct-forming assembly having a balanced omnidirectional rotational actuating arrangement in which there is no tendency to develop end loads upon rotational actuation.

These and other objects, features and advantages are realized in accordance with the instant invention by a structure defining a through duct having a throat section of minimum cross-sectional area which is universally mounted for omnidirectional rotation within a fixed envelope housing having an inner spherical seat.

In order to provide a throat area control capability, the duct-forming structure preferably comprises a concentrically arranged annular outer member and inner member defining a duct of annular cross-section which are rigidly interconnected for rotation as a unit. Control over the throat area magnitude is provided by an axially movable segment of the annular outer duct-forming member which is formed with an axially skewed throat defining surface and is constrainedly mounted on the axially fixed portion of the member for translational motion along the duct axis relative to the inner duct-forming member.

Advantageously, the axial displacement of the axially movable segment is controlled by actuating means disposed to act in a manner tending to force the segment to move axially towards the inner member so that a failure in the actuating system results in a maximization of the throat area under fluid flow conditions. Preferably, the actuating means comprises a toroidal bladder of rectangular cross-section to maximize the surface area bearing against the movable segment.

In accordance with the invention, omnidirectional rotational control is provided by two mutually independent rotational actuating systems exerting simultaneous and coordinated rotational control about two mutually orthogonal diametrical axes passing through the spherical center of rotation of the duct-forming members which axes, when the assembly is secured to a missile, preferably define a plane perpendicularly intersecting the longitudinal axis of the missile for controlling its pitch and yaw displacement.

Each actuating system includes a pair of diametrically opposed fluid cavity actuators built into the outer duct-forming member and pivotally mounted on the housing in axially aligned fashion on one of the two aforesaid diametrical axis for pivotal movement thereabout while controlling rotation of the duct-forming members about the other of the two axes. More specifically, each actuator comprises a circumferentially extending fluid cavity in the outer duct-forming member having two parallel end walls, two parallel side walls and a spherically curved bottom wall having a center of curvature which coincides with the spherical center of rotation of the members, and a fixed hydraulic vane member centrally pivotally mounted on the housing and disposed within the cavity in parallel relation with the end walls of the cavity, and in sliding and sealing engagement with the bottom and side walls as well as with the spherical seat of the housing. The side and end walls of the cavity are defined by a rectangularly configured annular floating sealing member which maintains a positive seal against extracavity leakage as well as against leakage around the vane. Rotational actuation is provided by selectively controlling the pressures within the cavities on opposite sides of their respective vane members in an inversely proportional relation via a pair of through passageways formed in the housing opening into the cavity on opposite sides of the vane which are connected to a fluid pressurization system including a closed centered valve having a neutral position to prevent fluid flow. A hydraulic actuating fluid is employed to permit instantaneous locking of the structure in any desired angular displacement.

Preferably, the fluid actuators of the two systems are all identical and are equidistant from the spherical center of rotation of the members, and opposed actuators of each pair are pressurized contradirectionally to develop equal and opposite rotational forces for producing coupling moments and eliminating end load. Still more preferably, the duct-forming members are formed so that their joint mass center of gravity substantially coincides with their spherical center of rotation to minimize the effect of inertia on the functioning of the assembly.

BRIEF DESCRIPTION OF DRAWINGS

Having summarized the invention, a detailed description follows with reference being had to the accompanying drawings which form part of this specification, of which.

DETAILED DESCRIPTION OF INVENTION

Figure 4:
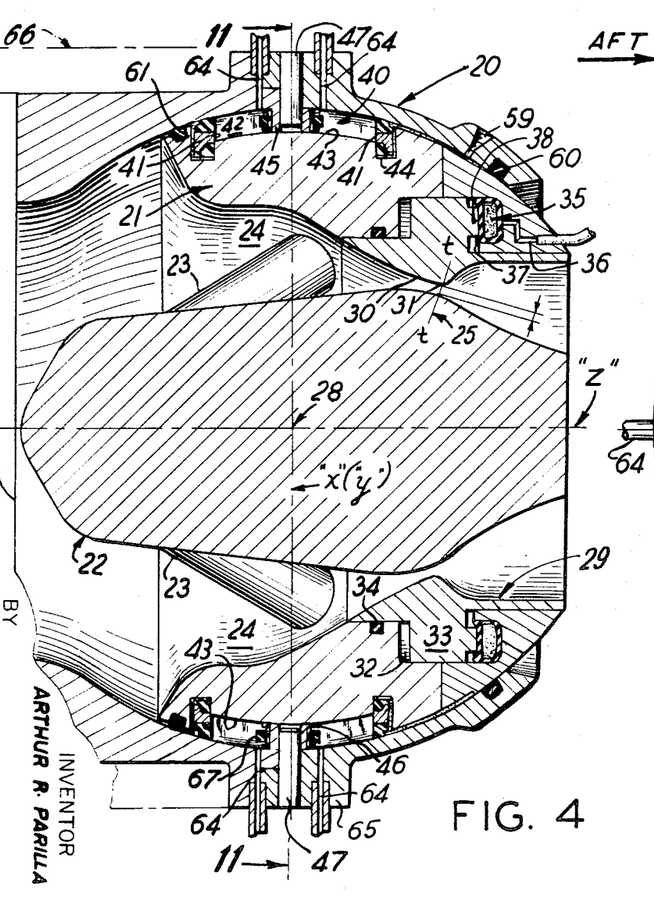
FIG. 4 is a sectional view taken centrally of the embodiment of FIG. 1 along line 4—4 of FIG. 3.
Figure 5:
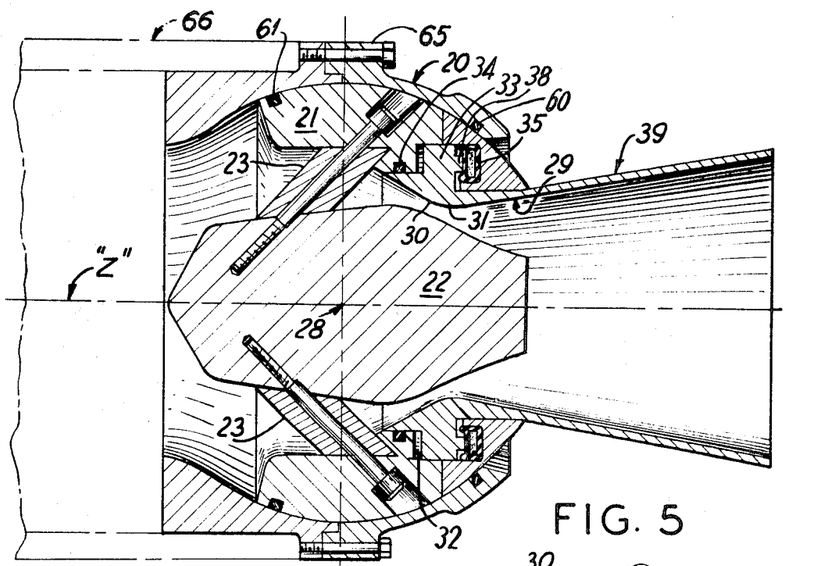
FIG. 5 is a sectional view taken centrally of a converging-diverging nozzle embodying the instant invention.
Figures 6, 6A:
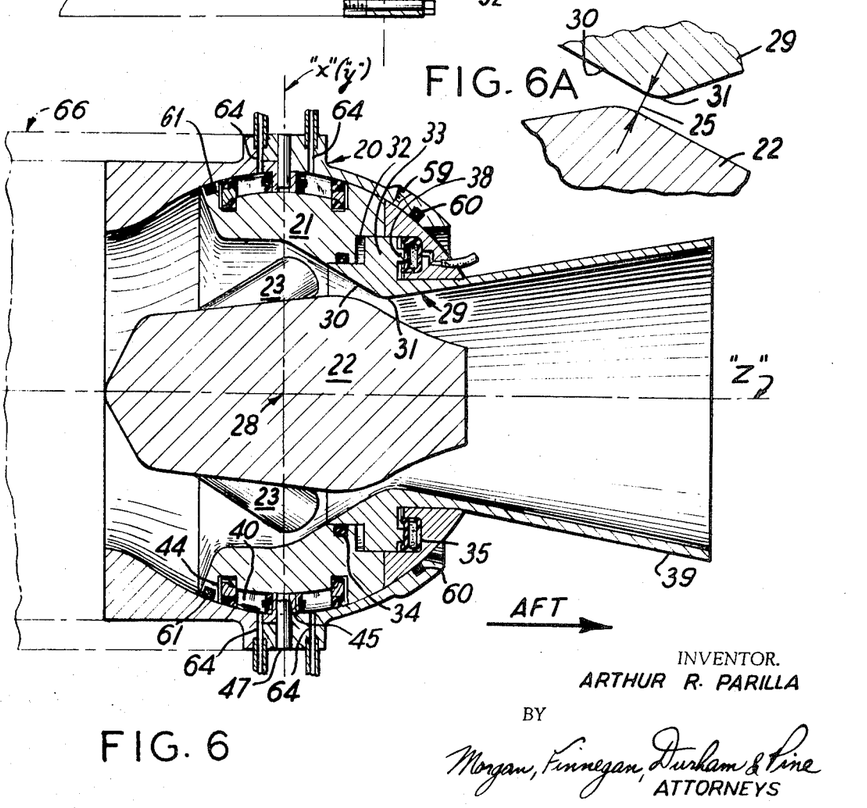
FIG. 6 is another central sectional view of the embodiment of FIG. 5 illustrating same in a plane which is angularly displaced 45° from the plane of the previous FIGURE.
FIG. 6A is an enlarged detail in section of the throat section portion of the annular duct of FIG. 6.

Turning now in detail to the accompanying drawings wherein like reference characters are employed to designate like parts throughout, two illustrative embodiments of the invention are shown. The embodiment of FIGS. 1-4 is that of a conventional rocket engine plug nozzle and the embodiment of FIGS. 5 and 6 is that of a conventional convergent-divergent rocket engine nozzle. It is to be understood, of course, that the assemblies are shown in greatly simplified form for clarity of description. Adaptation of the basic duct-forming assemblies, structures and arrangements of the invention to the hostile environment of a rocket engine is a matter of engineering design well within the skill of the art.

The duct-forming assemblies illustrated in the drawings comprise, in accordance with the invention, an outer annular envelope housing 20 defining an enlarged circular opening at its aft or right hand end which houses in universally mounted fashion for omnidirectional rotation a duct-forming structure including an annular outer duct-forming member 21 and an inner duct-forming member 22 which is, for simplicity, shown as a solid mass. Members 21 and 22 are rigidly interconnected in fixed concentric relation for rotation as a unit by four spaced apart compression struts 23 secured in any suitable manner. The concentrically arranged members define therebetween a symmetrical converging annular through duct 24 having a throat section defined by a plane 25 extending normally between the opposed surfaces of the two members at the point of minimum cross-sectional area of the duct. Universal mounting of members 21 and 22 is achieved by forming in the inner wall surface of the housing 20 a spherically contoured seat 26 for the outer annular duct-forming member 21, and by forming the latter with a mating spherical outer wall surface 27, with both surfaces having a common spherical center 28 defining the center of rotation of the duct-forming members. When assembled, a small radial clearance volume between the two spherical surfaces will be present and the annular rotatable member may be floated on a high pressure film of lubricant to reduce frictional forces, as shown and as more fully appears below.

As discussed above, the duct-forming members 21 and 22 are rigidly secured to one another for rotation as a unit. Consequently, the annular duct defined by the members is caused to rotate in its entirety with the duct-forming members. This feature is of great significance in achieving one of the main objectives of the instant invention which is the attainment of greater angular vector displacement and control than has heretofore been possible in rocket engine nozzles.

In a rocket engine, the propulsion gases passing through the duct of the nozzle are caused to reach sonic velocity in the throat section with increasing subsonic velocity being developed in the converging approach section of the duct. In nozzles where the duct-forming members are not rotatable as a unit, the rotation of one of the members relative to the other to effect a change of vector direction results in a change of the duct geometry thereby, of necessity, causing the propulsion gases to undergo a change of direction within the duct. Losses of efficiency result. As the relative angular displacement is increased during rotation, the change in duct geometry becomes more pronounced and moves progressively closer to the throat section where the propulsion gas flow is at a relatively high velocity. Consequently, the loss of efficiency increases as the angle of rotation is increased. As a practical matter, the maximum feasible angular displacement attainable with such nozzles is well below present day requirements. With the universally mounted integral duct-forming structures of the instant invention, no such limitation exists.

Figures 13, 14, 15, 16:
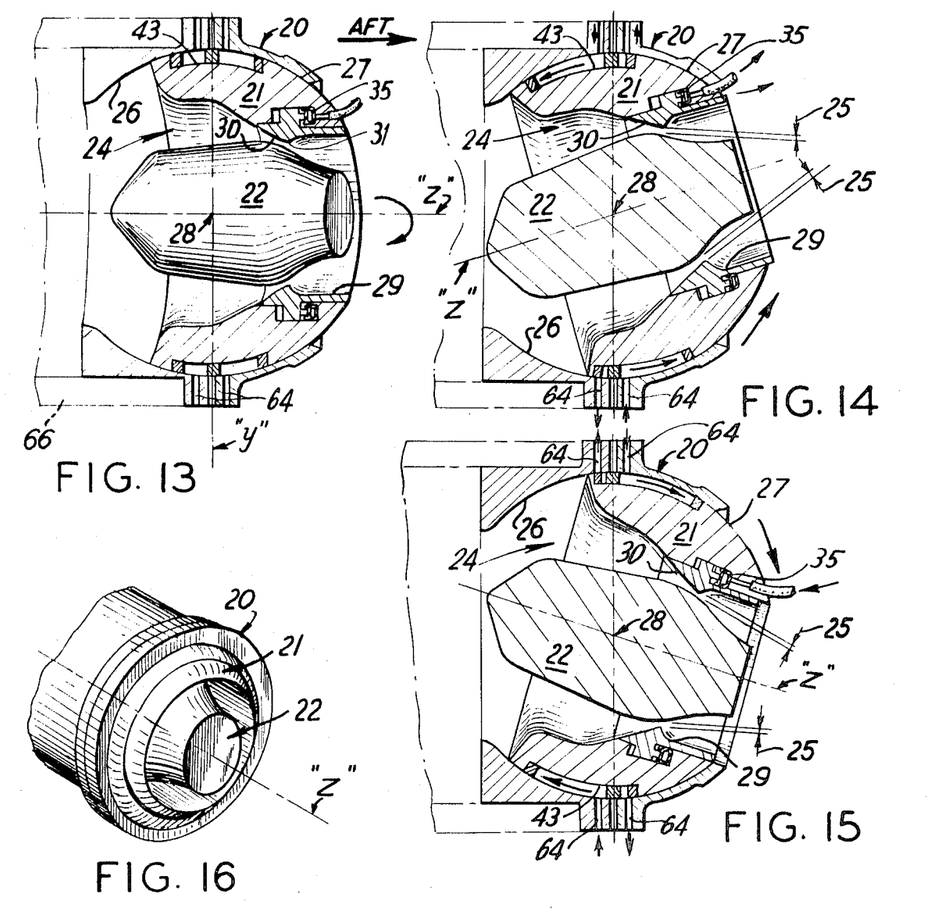
FIG. 13—15 are partially sectional partially diagrammatical views illustrating the omnidirectional rotational control and superimposed throat adjustability of the duct-forming structures of the instant invention.
FIGS. 16—18 are perspective views further illustrating the omnidirectional rotational control attainable with duct-forming structures of the instant invention.
Figure 17:
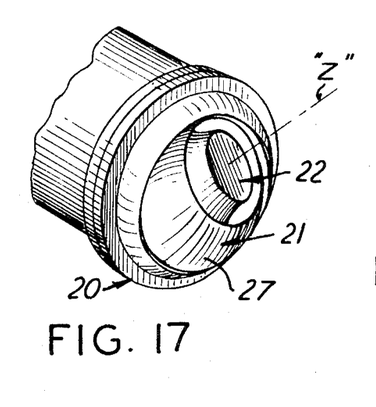
Figure 18:
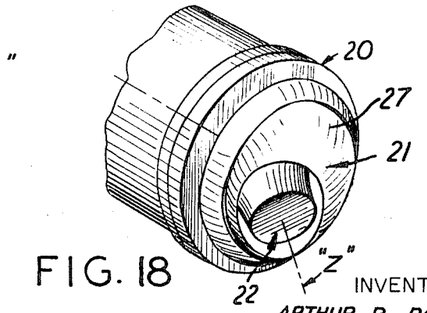

As can be clearly seen in FIGS. 14-16, the annular duct remains substantially fixed in geometry as the members turn within the housing 20, and any change of direction which a fluid passing through the duct may be caused to undergo will occur relatively far in advance of the throat section at the beginning of the duct where the flow is less restricted and at a velocity well within the subsonic range. By employing the special fluid cavity rotational actuators hereinafter described which are, in accordance with the invention, built into the rotatable structure itself, significant space savings are realized and the desired omnidirectional angular displacement and beyond is readily achievable well within prescribed size limitations of the outer envelope.

It is extremely advantageous in the practice of the invention, as will be appreciated, that the masses of the duct-forming members 21 and 22 be distributed so that their joint mass center of gravity substantially coincides with the spherical center of members 28 about which they rotate. In this way, the mass moment of inertia of the duct-forming members is substantially minimized and an increased frequency of rotational response is realized. Moreover, this feature of the invention results in a reduction in energy storage requirements for the rotational actuating systems with commensurate reductions in size and weight which are important considerations in rocket engine design.

In accordance with the invention, the magnitude of the throat area of the duct is made adjustable by an independently controlled throat adjusting subassembly of the rotatable duct-forming members. Specifically, throat magnitude control is provided by an annular throat adjusting insert 29 which comprises an axially displaceable segment of the annular duct-forming member 21. Segment 29 is formed with a throat defining surface at 30 which is skewed or inclined with respect to the symmetrical axis "Z" of the duct and which terminates aft at the region 31 of the segment defining the smallest circular opening therethrough. In the embodiment of FIG. 4, region 31 is defined by a Prandtl-Meyer flow corner, as is usual for plug nozzles. Translational motion of the segment 29 along the duct axis "Z" results in axial displacement of its axially skewed throat defining surface 30 relative to the inner member providing, thereby, the variable throat area capability desired (see FIGS. 14 and 15), with the throat section at all times being defined by the normal plane 25 extending between the two members at the minimum crossnsectional area of the duct (see FIG. 6A).

As will be appreciated, the translational motion of the axially movable segment 29 is superimposed on the rotational motion of the duct-forming structure as a whole. This is accomplished by constrainedly mounting segment 29 on the stationary portion of member 21 for translational motion along the axis "Z" via an interlocking flange and groove arrangement, as shown.

An annular groove or recess 32 of rectangular cross-section and uniform depth is formed in the inner surface (not designated) of the axially stationary segment of annular duct-forming member 21. Disposed within the recess 32 is an annular flange 33 of uniform height formed in the outer surface (not designated) of the axially movable segment 29. As can be seen, the aforementioned inner and outer surfaces of the axially stationary and movable segments of the annular member 21, respectively, extend parallel to the symmetrical axis "Z" of the duct and are in sliding engagement with one another and sealed against fluid passage therebetween by an O-ring seal 34. As can also be clearly seen, the axial dimension of recess 32 is greater than the like dimension of flange 33 thereby providing an axially oriented degree of freedom for the throat adjusting segment 29.

Continuous control over the axial position of movable segment 29 relative to inner member 22 is provided by fluid actuation menas comprising a toroidal bladder-like member disposed within recess 32 on the aft side of annular flange 33 in continual bearing relationship with the facing aft side walls of the recess and flange.

It is to be observed that with such an arrangement, the bladder is continuously exerting an axially oriented bearing force on movable segment 29 tending to cause the movable segment to displace towards inner duct-forming member 22 and a closed throat area position. When fluid flow is present in the annular duct defined by the members 21 and 22, internal fluid pressures are developed which exert a net axial force in the aft direction on the axially movable segment 29 tending to cause it to move away from the inner member 22. Hence, under fluid flow conditions the throat area normally tends to maximize. By positioning the actuating bladder 38, as shown, a counteracting force is provided and the aft directed internal pressure forces thereby serve a biasing function in controlling the axial position of the segment 29. In rocket engine nozzle applications, a "fail safe" condition is established by such placement of the bladder. In the event of loss of pressure to the bladder during operation, axially movable segment 29 will be forced by internal fluid pressures to move away from inner member 22 resulting in a maximization of the throat area.

Such placement of the bladder additionally facilitates the employment of external plumbing (not shown) for the actuation system which can be readily connected via a relatively short passageway 36 machined in the axially stationary portion of the duct-forming member 21. The advantages of positioning the plumbing externally of the outer envelope in rocket engines where an extremely hostile internal environment is developed are well known in the art.

The bladder 35 is preferably formed of elastomeric material reinforced by fiberglass filament which is wound with side-by-side winding of the elastomer to thereby provide a flexible bladder wall with a cross-section having a constant periphery. Still more preferably, the bladder is made to have a normally substantially rectangular cross-section, as shown, and the axially stationary segment of duct-forming member 21 is additionally formed with an annular axial extension 37 over-hanging the aft side of the annular recess to define a substantially rectangular housing (not designated) for the bladder. The housing offers support for the bladder along three of its walls. The aft side wall of the annular flange 33 of the movable segment is additionally formed with an annular axial extension 38 positioned to bear centrally upon a major portion of the fourth wall of the bladder with sufficient radial clearance on either side for the radiused walls of the bladder.

The rectangular cross-sectional configuration of the bladder offers the following advantages over other shapes:

1. It greatly increases the contact area between the axially movable segment 29 and the bladder resulting in much lower fluid pressure requirements for the bladder actuation system.

2. The contact area remains constant with axial displacement of the movable segment.

3. The clearance required in the radial direction between the inner and outer walls of the bladder is substantially less than with other configurations.

4. The stress in the bladder wall is greatly reduced since the unsupported radiused portions of the bladder are much smaller in the rectangular configuration.

5. The rectangular configuration assists in maintaining concentricity of the movable segment 29 since the two small radiused bladder portions on each radial side of the extension 38 tend to remain equal.

It is to be noted at this juncture that the two illustrative embodiments of the drawings differ only in the structure and geometry of their respective throat adjustment segments 29 aft of the constricted regions 31. In the plug nozzle embodiment illustrated in FIG. 4, the segment 29 is coterminus with the inner member 22 and, as has already been pointed out, has a Prandtl-Meyer corner defining the region 31. In the converging-diverging nozzle embodiment of FIGS. 5 and 6, the segment 29 is provided with a supersonic expansion cone 39 for applications where automatic altitude self-compensating throat area control is not important. It is to be understood that these two embodiments are included only by way of illustration of the universality of the principles of the present invention, and are not intended to be limiting in any way.

Figure 11:
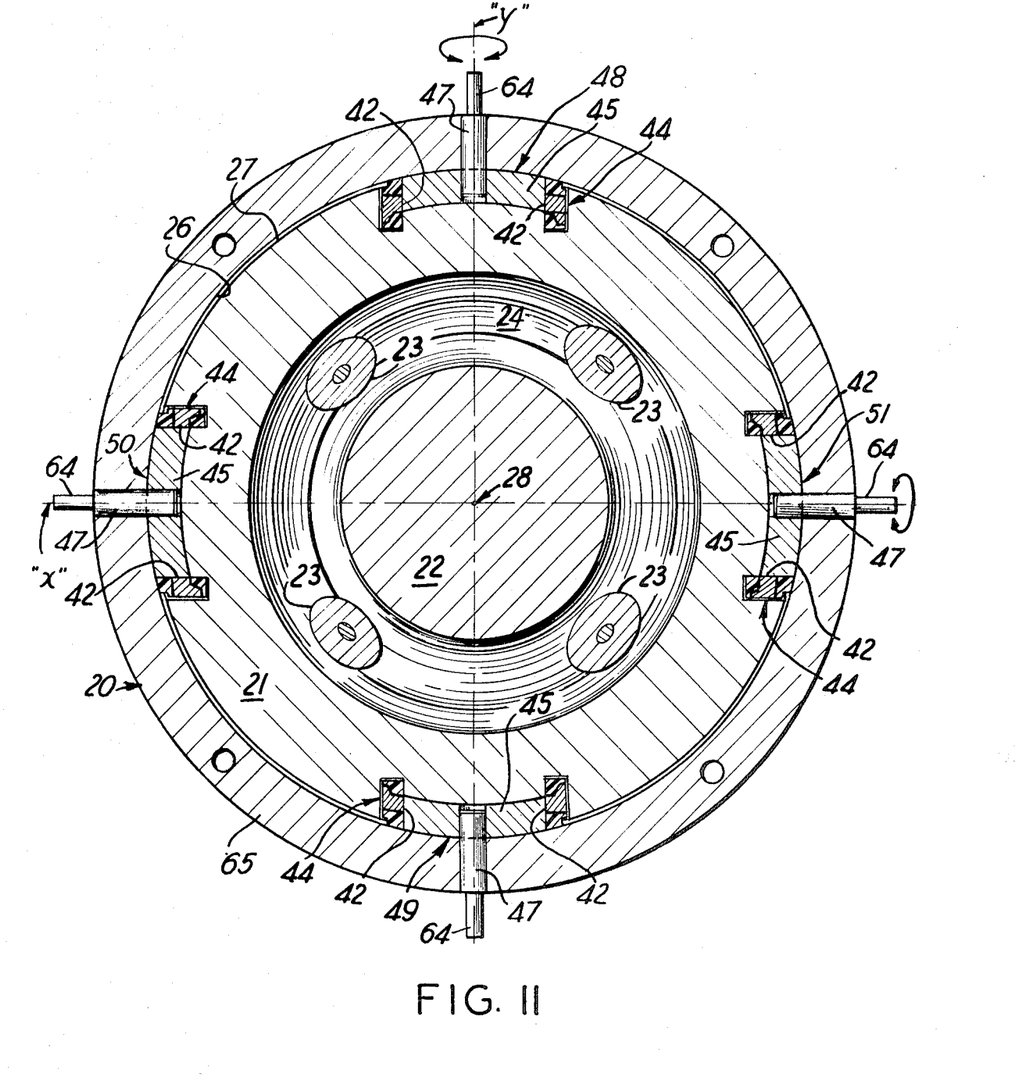
FIG. 11 is a sectional view taken along line 11—11 of FIG. 4 in the plane defined by the two orthogonal axes of rotation, illustrating the duct of 0° angular displacement in its symmetrical flow position.

In accordance with the invention, omnidirectional angular displacement of the duct axis "Z" with respect to the 0° or symmetrical flow condition shown in FIG. 11 is provided by rotational control means for rotating the duct-forming structure omnidirectionally about its spherical center of rotation 28. The control means comprises two mutually independent pressure actuating systems in association with special fluid cavity actuators built into the rotatable duct-forming structure itself for simultaneously and coordinately controlling the rotation of the structure about two mutually orthogonal diametrical axes "x" and "y" passing through the said center 28. When the duct-forming assembly is employed in a missile propulsion system, it is preferred that the two axes be oriented to perpendicularly intersect the longitudinal axis of the missile for control over pitch and yaw displacements.

Figure 1:
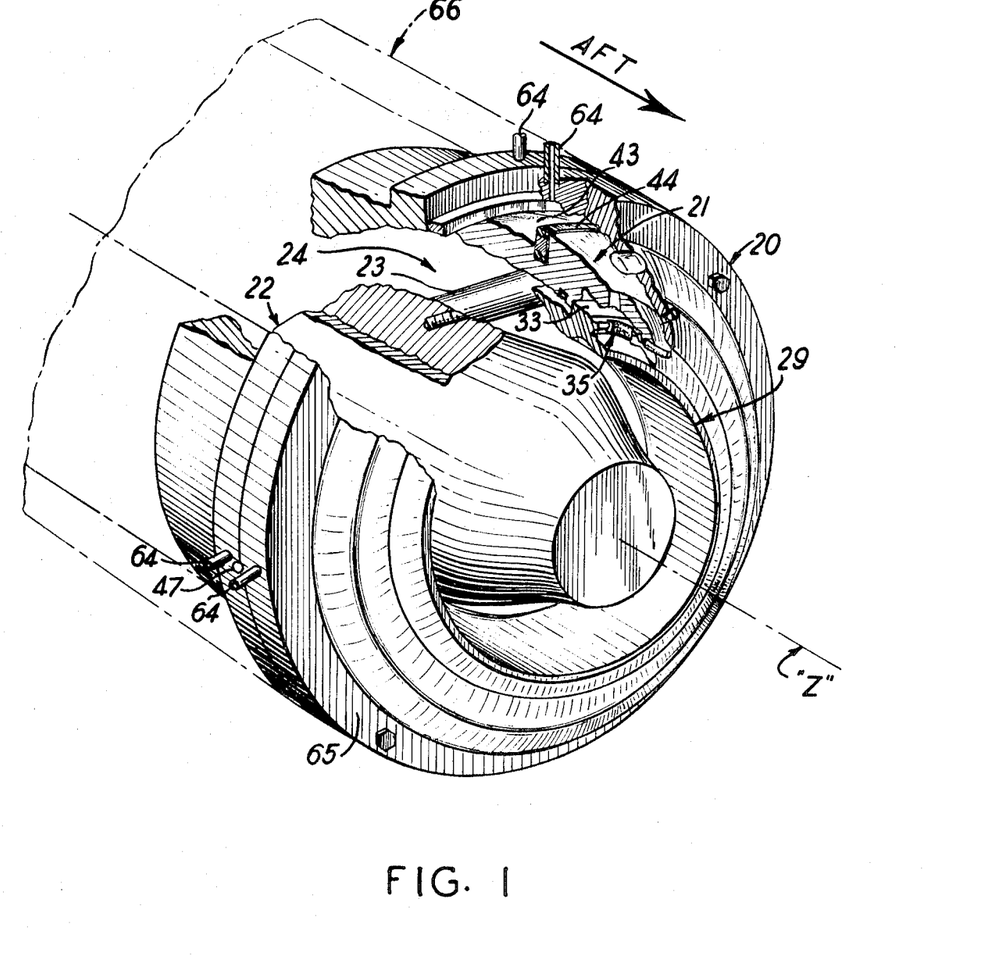
FIG. 1 is a perspective view of a plug nozzle embodiment of the invention with the housing and outer duct-forming member broken away to show various elements in their assembled relation.
Figure 2:
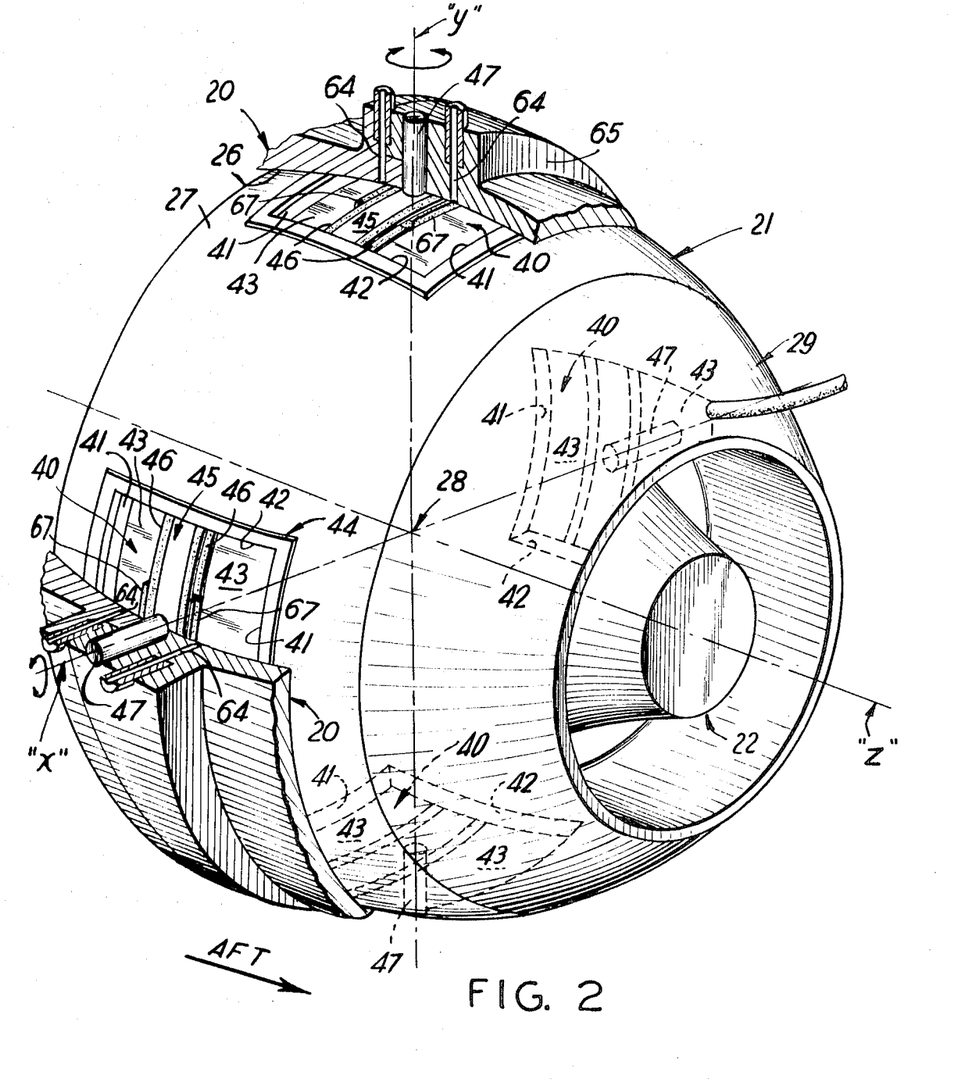
FIG. 2 is a partially diagrammatical view similar to FIG. 1 but with the housing only broken away and partially in section to reveal the arrangement of fluid cavity actuators.
Figure 3:
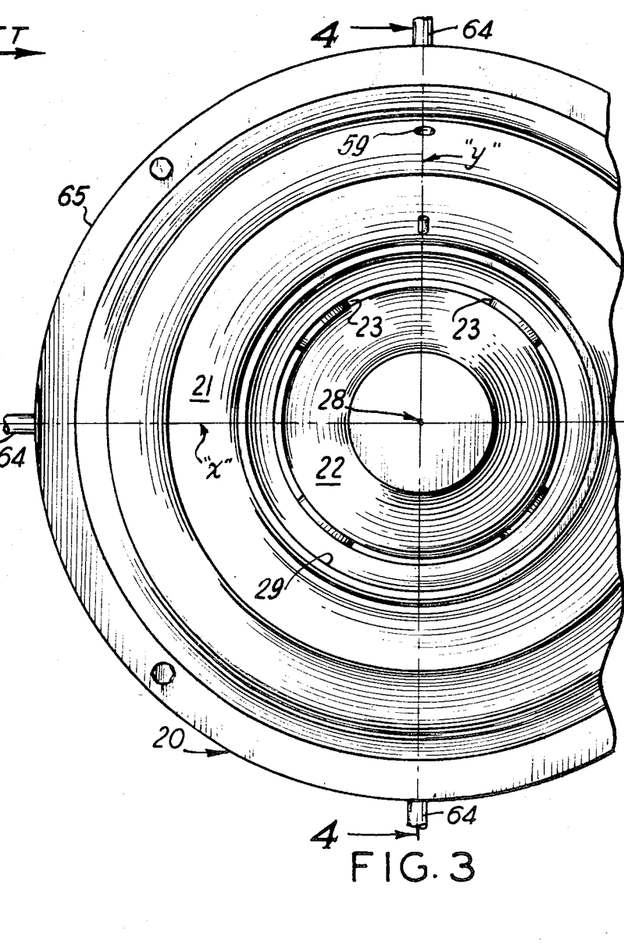
FIG. 3 is an end elevational view of the embodiment of FIG. 1 as seen from the aft end looking forward.
Figure 12:
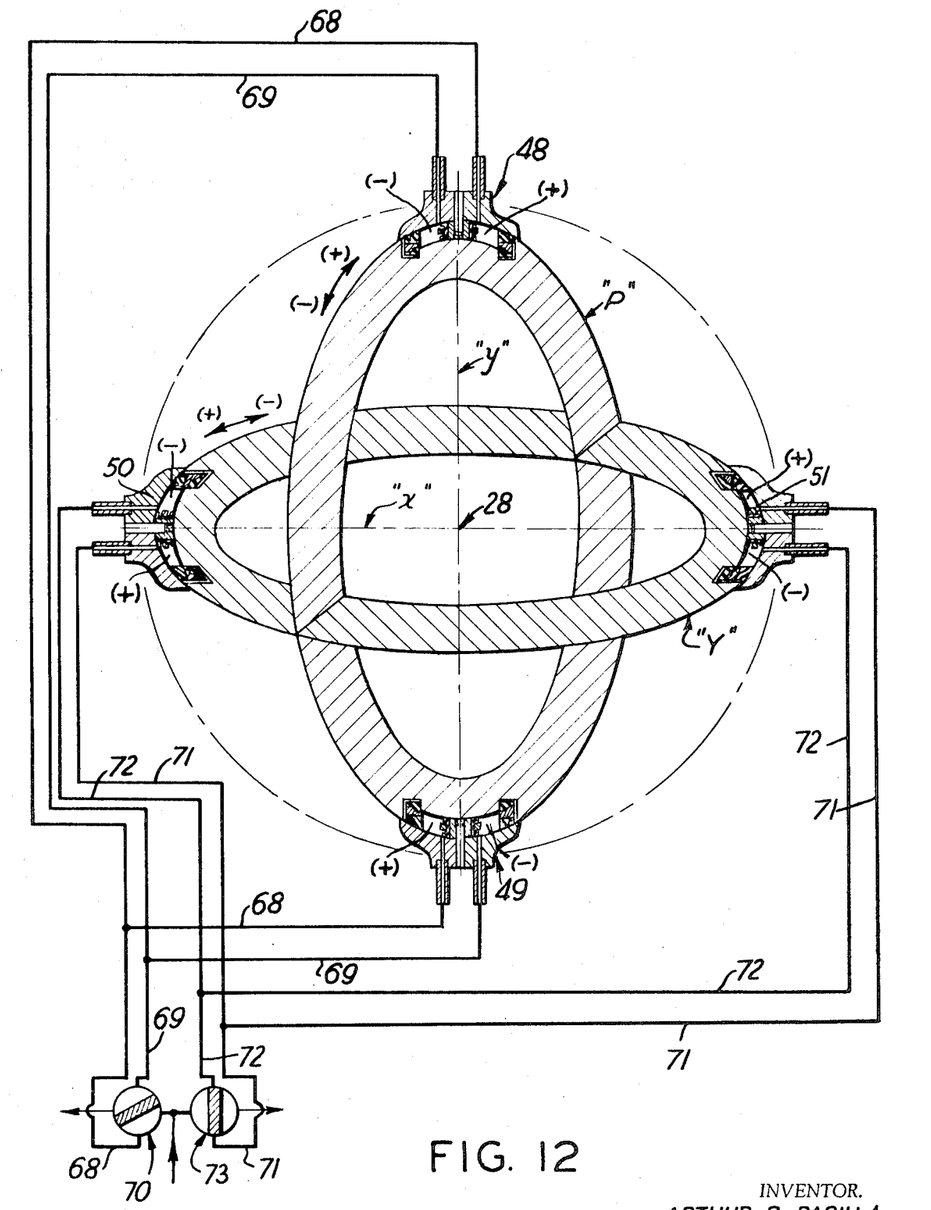
FIG. 12 is a partially diagrammatical representation of the two orthogonal planes of rotation extending centrally through the two pairs of cavity actuators of the duct-forming structure and a partially schematic representation of the two mutually independent fluid pressurization systems of the instant invention.

A typical rotational control arrangement of the invention is illustrated in FIGS. 2, 11 and 12. Before proceeding, however with a description of the overall control arrangement shown therein, a typical fluid cavity actuator of the invention will be described in sufficient detail to facilitate an understanding of the discussion which follows.

Generally, each actuator comprises a substantially rectangular circumferentially extending fluid cavity 40 having a pair of upstanding parallel end walls 41, a pair of upstanding parallel side walls 42, and a spherically curved bottom or inner wall 43 whose center of curvature is the spherical center 28 of the duct-forming members. The four upstanding walls of the cavity are in accordance with the invention, as will more fully appear below, formed by the floating rectangular sealing member 44 illustrated in detail in FIGS. 7, 8, 9 and 9A. An arcuate vane member 45, which is mounted on the housing 20 and therefore fixed relative to spherical center of rotation 28, is disposed within the cavity 40 in parallel relation to end walls 41 and, by means of a pair of sealing members 46 hereinafter described, is in sealing and sliding engagement with the side walls 42 and bottom wall 43 of the cavity as well as with the spherical seat 26 of the housing. By selectively controlling the relative fluid pressurization within the cavity on opposite sides of the vane member in a manner which fully appears below, rotational actuation and control is achieved. An imbalance in pressures on opposite sides of vane member 45 results in a net rotational force acting on one or the other of the two end walls 43 causing the duct-forming structure along with the cavity itself to rotate about spherical center 28 relative to the fixed vane which slides along the walls of the cavity.

In order to provide for rotational control about the two orthogonal axes the vane member 45 is pivotally mounted at its center on a radially extending pivot pin 47 which is, in turn, secured in any suitable manner as by press fit in the housing 20 so as to coincide with and define one of the two selected axes, "x" or "y." The entire actuator including cavity 40 and vane member 45 is consequently free to pivot as a unit with the duct-forming structure about a diametrical axis located centrally between the side walls 42.

Turning now to the overall omnidirectional control arrangement of the invention, and referring specifically to FIG. 11 which is a transverse sectional view of a typical duct-forming assembly at 0° angular displacement for symmetrical flow, there are shown a first pair of diametrically opposed cavity actuators 48 and 49 forming part of one actuating system for controlling rotation of the assembly about the "x" axis, and a second pair of diametrically opposed cavity actuators 50 and 51 angularly displaced 90° from the first pair forming part of a second independent actuating system for controlling rotation about the "y" axis.

As has been pointed out, each actuator is mounted on the housing to pivot centrally of its side walls about one or the other of the two orthogonal axes. It is important to observe in this connection that two actuators of each rotational control pair are coaxially aligned to control rotation about an axis which is orthogonal to the one on which they are aligned. This is best illustrated by FIG. 2. Hence, actuators 48 and 49, which provide rotational control about the axis "x," are situated on and pivot about the orthogonal axis "y" and, conversely, the other pair of actuators 50 and 51 are situated on and pivot about the axis "x" while controlling rotation about the orthogonal axis "y." As viewed in FIG. 11, the rotation in both instances is in to and out of the plane of the paper.

With the overall rotational control arrangement just described, each pair of actuators are capable of functioning to provide rotational actuation regardless of their own angular orientation or displacement with respect to the pivot axis on which they are aligned. Moreover, because each pair of actuators are freely pivotable about their own axis, there is no interference with the rotational actuating function of the other pair. Hence, rotation about both orthogonal axes can be caused to occur simultaneously to provide a single combined or resultant angular displacement from the symmetrical flow position. By coordinating the two independent rotational control systems, the duct-forming members can be caused to rotate omnidirectionally in any desired manner to provide any desired angular displacement in any desired plane or direction. In practice, a guidance system can provide instantaneous sets of coordinates for the two independent rotational actuating systems to produce the desired resultant angular displacements as more fully appears below.

Advantageously, the four individual cavity actuators are identical in construction and are equidistant from the spherical center of rotation 28. This relationship provides a balanced arrangement for omnidirectional rotation control. With the rotational actuation systems connected for like pressurization of the opposed actuators of each pair on the correlative sides of their vane members as is fully explained below, equal and opposite diametrically opposed rotational forces are exerted on the rotatable structure resulting solely in the establishment of a coupling moment or torque with no tendency towards the development of an end load.

As will be appreciated, the dimensions of the cavity of a given actuator will determine the magnitude of the rotational force which can be developed for a given relative pressurization as well as the length of its effective moment arm. Naturally, the greater the area of the upstanding walls of the cavity, the greater the rotational force developed. However, the deeper the cavity the shorter will be the effective distance from the spherical center of rotation to the point of application of the resultant fluid pressure force. Consequently, the cavity should be formed so that the product of the two, i.e., moment arm x rotation force, is maximized. In this way, the energy storage requirements for the rotational control systems are minimized with consequent reductions in size and weight.

In reducing the apparatus to practice, several important practical problems must be considered. One is maintaining adequate fluid seals between the vane member 45 and the walls of the cavity in order to prevent intracavity leakage of actuating fluid past the vane. A related problem is the maintenance of an effective seal around the perimeter of the cavity to prevent extra-cavity leakage through the radial clearance volume between the spherical seat 26 of the outer envelope 20 and the outer duct-forming member 21. This latter problem is complicated still further by the elastic deformation which the outer envelope tends to undergo when the assembly is pressurized.

The use of conventional O-ring and/or U-cup seals around the cavity perimeter are found to be inadequate for several reasons.

1. A built-in intracavity leakage path is created by the gap formed between the conventional peripheral cavity seal and the vane seal, the area of which is the product of the aforementioned radial clearance and the width of the retaining wall required for supporting such a peripheral seal;

2. Greater O-ring deformation or squeeze is required to maintain a peripheral seal as the outer envelope undergoes elastic deformation under pressurization; and 3. The increased radial clearance due to the elastic deformation of the outer envelope creates an increased risk of O-ring extrusion.

The aforesaid difficulties are overcome, in accordance with the present invention, by forming each cavity actuator with a specially constructed floating peripheral sealing member 44, and by employing a pair of internal segmented U-cup seals 46 for sealing against leakage past the vane member.

Each cavity actuator site in the outer duct-forming member is formed with a peripheral clearance volume 52 which extends upwardly to the spherical seat 26 of the housing to communicate with the aforementioned radial clearance volume, and downwardly below the spherical bottom wall 43 of the cavity to include an upstanding inner wall (not designated) defining the outer rectangular bounding edge of the cavity bottom wall. Situated within this peripheral clearance volume in spaced apart relation with the bottom thereof, in sealing engagement with the bounding edge of the cavity bottom wall, and in sealing and sliding engagement with the spherical seat of the housing is the peripheral sealing member 44.

Member 44 is in the shape of a rectangular annulus (see FIG. 7) having two parallel arcuate end walls 53, whose upstanding inner surfaces define the end walls 41 of the cavity, and two parallel arcuate side walls 54 whose upstanding inner surfaces similarly define the side walls 42 of the cavity. More specifically, the sealing member is essentially an annular structural member 55 of substantially rectangular cross-section with a suitable elastomeric or plastic sealing material 56 secured, as by bonding, to the upper surfaces of its four arcuate walls to seal against the inner spherical seat 26 of the housing, and an elastomeric sealing material 57 similarly secured to the lower surfaces of the walls to seal against the inner upstanding wall of the peripheral clearance volume 52 which defines the edge of the bottom cavity wall. The lower surface of structural member 55 is formed with an outer downwardly extending flange 58 situated to interfere with any pressure caused tendency of the lower elastomeric sealing material to laterally deflect outwardly in the region of the bottom cavity wall.

It is to be noted that the flange 58 is tapered. By forming the lower sealing material 57 so that it is forced to undergo elastomeric deformation upon assembly with the supporting flange, there is produced a built-in bearing pressure against the upstanding inner wall of the peripheral clearance volume to prevent extracavity leakage at the bottom wall of the cavity.

In accordance with the invention, each cavity actuator is provided with biasing means acting on the sealing member 44 in a manner tending to produce a positive bearing pressure at its sealing surfaces. As can most clearly be seen in FIGS. 9 and 9A, a high pressure lubricating fluid introduced via an inlet port 59 formed in the housing is sealed within the radial clearance volume between the housing and duct-forming member 21 and within the peripheral clearance volume 52 by two O-ring seals 60 and 61. Preferably, the pressure of the lubricating fluid is higher than the pressure of the actuating fluid within the cavity.

The lubricating fluid, while serving to reduce frictional forces between the spherical seat 26 and the outer spherical surface 27 of the duct-forming member, also serves the dual function of maintaining the floating sealing member 44 in a positive sealing engagement with the spherical seat of the housing and the bounding edge of the bottom wall of the cavity. The pressurized lubricating fluid exerts an upward force on the floating sealing member compressing the upper sealing material against the spherical wall of the housing to provide a positive seal against leakage out of the cavity. As elastic deformation of the envelope occurs during pressurization, the sealing member is caused to float to the position required to maintain the positive seal. A mechanical spring (not shown) of any suitable type situated at the bottom of the peripheral clearance volume 52 acts on the floating sealing member to provide the initial biasing force for producing a positive seal. The lubricating fluid also exerts a normal force on the lower elastomeric seal which, due to Poisson's ratio for the elastomeric material, serves to create additional bearing pressure for maintaining a positive seal against extracavity leakage at the bottom of the cavity as well as against intracavity leakage past the vane.

Figures 7, 8, 9, 9A, 10:
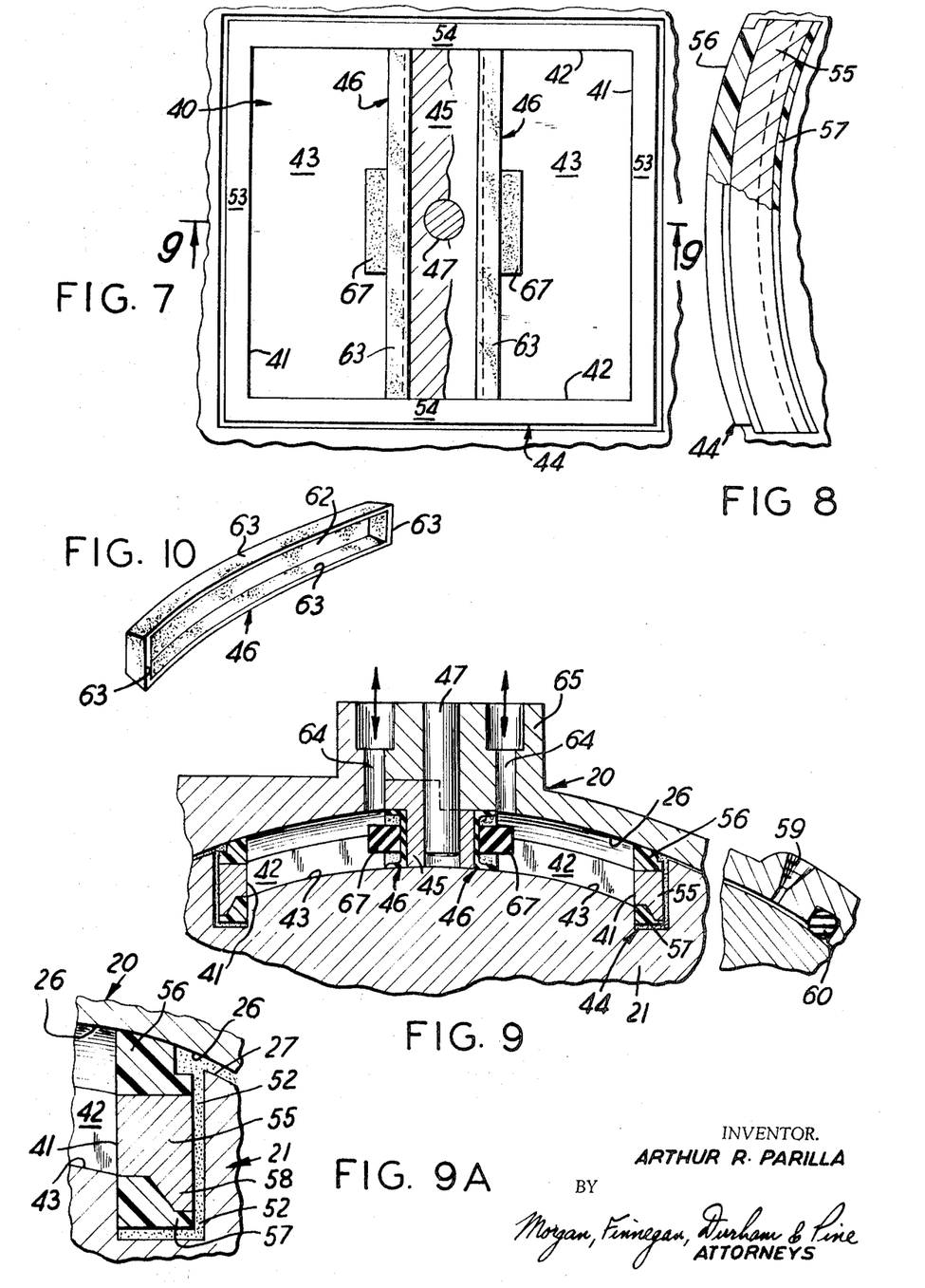
FIG. 7 is an enlarged plan view of a typical fluid cavity actuator forming part of the rotational actuating systems of the instant invention.
FIG. 8 is an end elevational view partially in section of a typical floating sealing member which forms, in accordance with the invention, the upstanding side and end walls of the fluid cavity of FIG. 7.
FIG. 9 is a fragmentary sectional view taken centrally of the cavity actuator of FIG. 7 along line 9—9 thereof.
FIG. 9A is an enlarged detail in section of the end wall forming portion of the floating sealing member of FIG. 9.
FIG. 10 is a perspective view of a typical segmented U-cup employed in accordance with the invention for sealing against intracavity leakage past the hydraulic vanes of the several cavity actuators.

The internal cavity seal at the vane member 45 is, as has already been pointed out, formed by a pair of elastomeric segmented U-cup members 46 situated on opposite sides of the vane, as shown. Referring to FIG. 10, each sealing member is a molded piece having an arcuate back wall 62 and a normally outwardly angled peripherally extending four-sided lip 63 depending from the back wall. When assembled, the back wall 62 engages one side of the vane member 45 and the peripheral lip 63 is deflected into a sliding interference fit with the side and bottom walls of the cavity and the spherical seat 26 of the housing. This interference fit provides an initial sealing pressure which is reinforced by the internal fluid pressures within the cavity which tend to force the lip outwardly against the engaged cavity walls. As can clearly be seen in FIG. 7, the lip of each vane sealing member 46 makes direct contact with the inner surfaces of side walls 54 of the floating seal 44 which define the side walls 42 of the cavity, thereby eliminating the extracavity leakage gap normally present with conventional seals.

Control over the relative actuating pressures within the cavities is provided by the two identical mutually independent fluid pressurization systems schematically illustrated in FIG. 12. In order to provide continuous fluid pressure communication between the two systems and their respective actuator cavities on both sides of the hydraulic vanes situated therein, each actuator is provided with a pair of fluid passageways 64 machined into the annular mounting flange 65 formed on the outside of the housing for mounting the duct-forming assembly as, for example, to a missle casing 66. The passageways 64, extend through the housing to open into the cavity on opposite sides of the vane in equidistant relation to the pivot pin axis with respect to which they remain fixed. Blockage of the cavity openings of the passageways 64 by one or the other of the end walls 41 as they move relative to the vane 45 is prevented by a pair of clearance members 67 which are secured in any suitable manner to opposite sides of the vane member. As shown, each clearance member extends away from the vane member a sufficient distance to prevent its corresponding cavity end wall from moving past the passageway opening.

Referring to FIG. 12, the overall omnidirectional rotational control system comprises two independent pressurization systems; one system illustratively controlling rotation in the vertical pitch plane "P" about the horizontal pitch axis "x," and the other system illustratively controlling rotation in the horizontal yaw plane "Y" about the vertical yaw axis "y." The two diametrically opposed pitch actuators 48 and 49 pivotally aligned on the yaw axis of rotation "y" form part of the pitch control system for controlling rotation in plane "P" about axis "x." The two diametrically opposed yaw actuators 50 and 51 pivotally aligned on the pitch axis "x" form part of the yaw system for controlling rotation in the "Y" plane about axis "y."

For convenience, each plane of rotation has been accorded plus and minus rotational directions. As indicated by the arrows, clockwise rotation of the vertical pitch plane of rotation "P" produces positive (+) angular displacement about the pitch axis "x," whereas counterclockwise rotation produces angular displacement in the negative (−) direction. Conversely, counterclockwise rotation in the horizontal yaw plane of rotation "Y" about the vertical yaw axis "y" produces positive (+) angular displacement while clockwise rotation results in angular displacement in the negative (−) direction. The side of each of the cavities with respect to its vane members which will yield positive angular displacement when pressurized has been designated with the plus (+) symbol whereas the side which, when pressurized, produces negative (−) angular displacement has been designated with the minus (−) symbol.

Referring first to the pitch control system, the two opposed pitch-actuators 48 and 49 are connected via high pressure fluid conduits 68 and 69 to a flow control valve 70. Similarly, the yaw control actuators 50 and 51 are connected by high pressure fluid conduits 71 and 72 to a flow control valve 73.

As has already been pointed out, each of the systems is operative in accordance with the invention to exert equal and opposite diametrically opposed rotational forces on the duct-forming structure. Towards this end, the correlative or corresponding sides of the actuator cavities of each diametrically opposed actuator pair are interconnected for fluid pressure communication therebetween. In the pitch control system, the plus (+) sides of the pitch control actuators 48 and 49 are connected in parallel to the flow control valve 70 by conduit 68 while the negative (−) sides of the actuators are connected in parallel via conduit 69. In the yaw control system, the plus (+) sides of the actuators 50 and 51 are connected in parallel to flow control valve 73 via fluid conduit 71, while the negative (−) sides are connected in parallel via conduit 72. Consequently, the same instantaneous pressure always exists within the correlative sides of the cavities of each diametrically opposed actuator pair, with the differential pressures in the actuators therefor also being the same. The cavity actuators all being identical in size, equal diametrically opposed forces result, with the forces being directed in reinforcing or coupling moment relation with respect to the rotational axes which they control.

Advantageously, the valves 70 and 73 employed to control flows in the two systems are of the conventional closed centered type, as shown, having a pressure inlet port connected to a pressure source of actuating fluid, a pressure outlet port, and two ports connected to the two fluid conduits of the system. As can be seen, the pressure inlet and outlet ports are on opposite sides of the valve as is the case with the two fluid conduit ports, and the valve has a conventionally actuated pivotally movable center body for selectively establishing communication between the four ports. More specifically, in one position of the valve center body the pressure inlet port is connected to one of the fluid conduit ports while the pressure outlet port is connected to the other fluid conduit port. In another position of the valve, the connections are reversed. In a third position of the valve, none of the four ports are interconnected.

In the first two valve positions above described, equal and opposite fluid flow in the two conduits of the system is established. In other words, when the correlative sides of the opposed actuator cavities of the system for producing rotation in one direction are being pressurized, the opposite correlative sides of the two actuator cavities for producing rotation in the opposite direction are being equally depressurized. As will be appreciated, this fluid flow condition of the system is essential to the proper functioning of the apparatus. In the third valve position above described, there is no fluid flow in either of the two fluid conduits of the system.

It is preferred that a hydraulic actuating fluid be employed. In such a system, by merely closing the control valve the actuator cavities can be instantaneously locked in any given position with respect to their vanes to thereby lock the duct-forming structure at any given angular displacement. In addition, the rotational response time is optimized. In a system employing a compressible fluid, a certain amount of response lag will normally be encountered.

It is to be noted that while the two control valves are mutually independent in operation, they can be supplied from a common high pressure fluid source, as shown. In the practice of the invention, the two valves can be coordinated by an overall guidance system (not shown), to produce the coordinated rotational response necessary to establish the desired angular displacement.

The operation of the system will now be described. Prior to rotational actuation, the pitch and yaw control valves 70 and 73 are in their closed centered or neutral position with the duct-forming structure illustratively in the 0° symmetrical flow position of FIG. 11. When it is desired to produce a given angular rotation, the two valves are actuated coordinately to produce the necessary pitch and yaw displacements to arrive at the coordinate angular displacement. For example, should positive pitch displacement be desired with no yaw displacement, the pitch control valve 70 is actuated to connect the fluid conduit 68 common to the plus (+) sides of the actuators 48 and 49 to the pressure inlet port while simultaneously connecting the minus (−) sides of the actuators to the pressure outlet port. This fluid flow condition in the system produces an increase in pressure in the positive (+) rotation sides of the cavities and a decrease in pressure on the negative (−) sides, with the pressures in the correlative sides of the two opposed cavities being equal. The imbalance in pressures within the two cavities produces equal and opposite diametrically opposed rotational forces acting in the positive (+) angular displacement direction in the pitch plane "P." As rotation in the pitch plane occurs, the two opposed yaw actuators 50 and 51 pivotally aligned on the diametrical pitch axis "x" are caused to turn or pivot about the said axis. It is to be noted that while the yaw actuators have assumed new angular orientations due to the pitch displacement, there has been no volumetric displacement of their respective vane members within the cavities. Hence, no yaw displacement has occurred.

When the desired angular displacement about the pitch axis has occurred, the pitch control valve 70 is again actuated to assume its closed centered or neutral position thereby locking the pitch actuators in the pressurized state pertaining at the instant the duct-forming structure is at its desired displacement. The structure can be brought back to its 0° symmetrical flow position simply by reversing the actuation direction of the pitch control valve to establish communication between the fluid conduit 68 common to the positive (+) sides of the actuators and the outlet port while simultaneously establishing communication between the conduit 69 and the pressure inlet port. As will be obvious, yaw rotational actuation is identical to the pitch actuation just described. Angular rotation in a coordinate plane intermediate the pitch and yaw planes is simply accomplished by coordinate the actuation of the pitch and yaw control valves.

While rotational actuation is occurring or otherwise, the magnitude of the duct throat area 25 (FIG. 6A) can be independently regulated simply by controlling the pressurization of the toroidal bladder 35. When the fluid pressure is increased, the bladder wall bearing against the annular flange 33 of the throat adjusting segment 29 is forced to move away from the fixed opposing bladder wall as the bladder becomes more inflated. Consequently, until a pressure balance is obtained the axially movable adjusting segment 29 is forced to displace axially upstream against the pressure of the fluid which may be flowing through the duct and towards inner duct-forming member 22. Because of the axially skewed orientation of the throat defining surface 30 of the adjusting segment, the throat section of the duct is caused to assume a new position upstream with a consequent reduction in the magnitude of the throat area. The effect of a change in throat area on chamber pressure and thrust for solid propellant rocket engines is described in the above referenced U.S. Pat. No. 3,094,072. The axial clearance space between the axially movable segment 29 and the stationary segment of outer member, 21, limits the forward displacement of the movable member 29 so as to provide a minimum throat area which would not exceed the maximum allowable chamber pressure. By increasing the clearance sufficiently, complete closure of the duct can be caused to occur as the throat defining surface 30 of the adjusting segment makes contact with the inner member. When it is desired to increase the throat area, the bladder pressure is simply reduced to create an imbalance of axial forces on the movable segment 29 with the internal fluid pressure forces causing it to displace downstream away from inner member 22.

It is to be observed that the bearing surface of the bladder contacting the flange of the movable segment 29 remains constant during actuation which, as will be appreciated, greatly simplifies the control function.

The invention in its broader aspects is not limited to the specific embodiments, details, arrangements, steps, procedures and the like shown and described herein for illustrative purposes, but departures may be made therefrom within the scope and spirit of the invention as defined in the appended claims without sacrificing its chief advantages.

What is claimed is:

1. A duct-forming assembly comprising
   a. an annular non-rotatable housing having an inner spherically contoured seat;
   b. a duct-forming structure defining a through duct universally mounted within said housing on said seat and omnidirectionally rotatable therein, said structure being formed with an outer spherically contoured wall surface having a common spherical center with said spherical seat about which said structure rotates; and
   c. rotational control means responsive to external control for rotating said duct-forming structure omnidirectionally within said housing, said duct-forming structure comprising a pair of concentrically arranged duct-forming members including an outer annular member and an inner member defining a symmetrical converging annular duct therebetween having a throat section of minimum cross-sectional area, said members being rigidly interconnected for rotation as a unit within said housing.

2. An assembly as defined in claim 1 wherein said spherical center of rotation substantially coincides with the mass center of gravity of said duct-forming structure.

3. An assembly as defined in claim 1, said omnidirectional rotational control means comprising two mutually independent rotational control systems operative to simultaneously and coordinately control rotation of said duct-forming structure about two mutually orthogonal diametrical axes passing through said spherical center of rotation.

4. An assembly as defined in claim 3, wherein said mutually independent rotational control systems each include actuator means for exerting equal and opposite diametrically opposed rotational forces on said duct-forming structure.

5. An assembly as defined in claim 4, wherein said actuator means are positioned to exert said diametrically opposed rotational forces at points equidistant from said spherical center of rotation.

6. An assembly as defined in claim 1, said omnidirectional rotational control means including fluid cavity actuators built into said rotatable duct-forming structure for exerting rotational forces on said structure.

7. A duct-forming assembly comprising
   a. an annular non-rotatable housing having an inner spherically contoured seat;
   b. a duct-forming structure defining a through duct universally mounted within said housing on said seat and omnidirectionally rotatable therein, said structure being formed with an outer spherically contoured wall surface having a common spherical center with said spherical seat about which said structure rotates; and
   c. rotational control means responsive to external control for rotating said duct-forming structure omnidirectionally within said housing, said omnidirectional rotation control means including two mutually independent pairs of diametrically opposed fluid cavity actuators pivotally mounted on said housing on two mutually orthogonal diametrical pivot axes passing through said spherical center of rotation and built into said rotatable duct-forming structure for exerting rotational forces on said structure.

8. An assembly as defined in claim 7 wherein each pair of said pivotally mounted cavity actuators is formed to control rotation of said duct-forming structure about the orthogonal pivot axis defined by the other pair of said actuators.

9. An assembly as defined in claim 8, wherein each cavity actuator comprises
   i. a substantially rectangular cavity in said duct-forming structure having a pair of parallel end walls, a pair of parallel side walls, and a spherically contoured bottom wall with a center of curvature coincident with said spherical center of rotation;
   ii. a vane member centrally pivotally mounted on said housing and disposed within said cavity in parallel movable relation with said end walls, and in sealing and sliding engagement with said parallel side walls and spherical bottom wall of said cavity and said spherical seat of said housing; and
   iii. a pair of fluid conduits formed in said housing opening into said cavity on opposite sides of said vane member.

10. An assembly as defined in claim 9, wherein each actuator site is formed with a peripheral clearance volume extending upwardly to said inner spherical seat of said housing and downwardly below said spherical bottom wall of said cavity to define the outer rectangular bounding edge of said bottom wall, and wherein each cavity actuator further comprises
    iv. an unsecured annular sealing member disposed within said peripheral clearance volume in spaced apart relation with the bottom thereof, in sealing engagement with said outer rectangular edge of said spherical bottom wall, and in sealing and sliding engagement with said inner spherical seat, and having a rectangular inner wall surface defining the said side and end walls of the cavity; and
    v. biasing means acting on said sealing member for creating a positive sealing pressure at said spherical seat.

11. An assembly as defined in claim 10, wherein said biasing means comprises a mechanical spring positioned at the bottom of said peripheral clearance volume.

12. An assembly as defined in claim 11, wherein said biasing means further comprises a high pressure fluid sealed within said peripheral clearance volume exerting an upward force on said sealing member causing it to at all times maintain a positive sealing relationship with said spherical seat.

13. An assembly as defined in claim 12, wherein said fluid in said peripheral clearance volume is at a greater pressure than the actuating fluid within said cavity.

14. An assembly as defined in claim 10, wherein said sealing member comprises a rectangularly configured annular structural member, and an elastomeric sealing material secured thereto defining the sealing surface of said member in the region of said spherical bottom cavity wall.

15. An assembly as defined in claim 14, wherein said annular structural member has an outer downwardly extending tapered flange engaging said elastomeric sealing material and said sealing material in the region of the flange is formed to undergo elastic deformation in the assembled condition to thereby exert a built-in bearing pressure at the bottom of said cavity to effect a peripheral seal.

16. An assembly as defined in claim 10, wherein each cavity actuator further comprises a pair of elastomeric internal sealing members operatively associated with said vane member on opposite sides thereof in interference fitting relation with said side and bottom walls of said cavity and said spherical seat of said housing effecting a sliding seal therewith against intracavity leakage past said vane.

17. An assembly as defined in claim 9, wherein each cavity actuator further comprises a pair of elastomeric internal sealing members operatively associated with said vane member on opposite sides thereof in interference fitting relation with said side and bottom walls of said cavity and said spherical seat of said housing effecting a sliding seal therewith against intracavity leakage past said vane.

18. An assembly as defined in claim 17, wherein each of said elastomeric sealing members comprises a molded segmented U-cup having a back engaging one side of said vane member and a normally outwardly angled peripherally extending four-sided lip depending from said back wall inwardly into said cavity.

19. An assembly as defined in claim 9, wherein said omnidirectional rotational control means comprises two identical mutually independent rotational control systems operative to coordinately control rotation of said duct-forming structure about two mutually orthogonal diametrical axes passing through said spherical center of rotation of said structure, each of said systems comprising an identical pair of said cavity actuators diametrically opposed with their respective vane members coaxially pivotally aligned in equidistant relation from said spherical center on one of said diametrical axes and being operatively disposed with respect to the other of said diametrical axes and interconnected in said system to exert simultaneous equal and opposite diametrically displaced forces on said structure in coupling moment relation with respect to said other axis.

20. An assembly as defined in claim 19 wherein each of said rotational control systems further comprises fluid pressurization means for selectively pressurizing said opposed actuator cavities on correlative sides of their respective vane members and simultaneously equally depressurizing the correlative opposite sides thereof.

21. An assembly as defined in claim 20 wherein said fluid pressurization means comprises a closed centered valve having a neutral position to prevent fluid flow for maintaining any desired relative pressurization within said actuator cavities.

22. An assembly as defined in claim 9, wherein said rotational control means comprises fluid pressurization means for selectively pressurizing each of said actuator cavities on one selected side of said vane member and simultaneously equally depressurizing the opposite side thereof.

23. An assembly as defined in claim 22, said fluid pressurization means comprising valving means for maintaining any desired relative pressurization within each of said actuator cavities.

24. An assembly as defined in claim 23, said fluid pressurization means including conduit means establishing direct pressure communication between each pair of opposed actuator cavities on operatively correlated sides of their respective vane members.

25. An assembly as defined in claim 1, said duct-forming structure further comprising a throat area adjustment subassembly rotatable with said structure and operative to vary the cross-sectional area of said throat section independently of the rotation of said structure.

26. An assembly as defined in claim 25, said throat adjustment subassembly comprising
   i. an axially movable segment of said outer annular duct-forming member having a throat defining surface which is skewed to the symmetrical axis of said duct, said segment being constrainedly mounted on the axially stationary segment of said annular member for translational motion along said axis towards and away from said inner duct-forming member; and
   ii. actuation means for controlling the axial position of said axially movable segment relative to said inner member.

27. An assembly as defined in claim 26, said actuation means being disposed to at all times act in a direction tending to cause said axially movable segment to displace upstream towards said inner member.

28. An assembly as defined in claim 27, said actuation means comprising a toroidal bladder disposed in bearing relationship between the axially fixed and axially movable segments of said outer duct-forming member.

29. An assembly as defined in claim 28, wherein said toroidal bladder has a substantially rectangular cross-section.

30. An assembly as defined in claim 29, wherein said axially stationary segment of said annular duct-forming member defines a rectangular housing for said bladder disposed in supporting relation with said bladder on three of its four rectangular walls.

31. An assembly as defined in claim 26, said axially movable throat adjustment segment of said outer duct-forming member further having a diverging cone-shaped inner surface extending from said throat defining surface aft from said inner duct-forming member.

32. An assembly as defined in claim 1, said duct-forming members being formed with their joint mass center of gravity substantially coinciding with said spherical center of rotation.

33. A duct-forming assembly comprising
   a. an annular non-rotatable housing having an inner spherically contoured seat;
   b. a duct-forming structure defining a through duct universally mounted within said housing on said seat and omnidirectionally rotatable therein, said structure being formed with an outer spherically contoured wall surface having a common spherical center with said spherical seat about which said structure rotates; and
   c. rotational control means responsive to external control for rotating said duct-forming structure omnidirectionally within said housing, said duct-forming structure comprising means for varying the effective cross-sectional area of said duct independently of rotation thereof.

34. An assembly as defined in claim 33, further comprising an integral extension of said duct-forming structure having an inner diverging cone-shaped surface defining a diverging continuation of said duct.

35. A duct-forming assembly comprising
   a. an annular non-rotatable housing having an inner spherically contoured seat;
   b. a duct-forming structure defining a through duct universally mounted within said housing on said seat and omnidirectionally rotatable therein, said structure being formed with an outer spherically contoured wall surface having a common spherical center with said spherical seat about which said structure rotates; and
   c. rotational control means responsive to external control for rotating said duct-forming structure omnidirectionally within said housing,
   said omnidirectional rotational control means comprising two mutually independent rotational control systems operative to simultaneously and coordinately control rotation of said duct-forming structure about two mutually orthogonal diametrical axes passing through said spherical center of rotation, each of said independent rotational control systems comprising actuation means pivotally coupled to said housing on one of said diametrical rotational axes and operative to exert a rotational force relative to the orthogonally extending rotational axis of said structure.

* * * * *